(12) United States Patent
Robinett, III et al.

(10) Patent No.: US 9,263,894 B2
(45) Date of Patent: *Feb. 16, 2016

(54) CUSTOMIZED ELECTRIC POWER STORAGE DEVICE FOR INCLUSION IN A COLLECTIVE MICROGRID

(75) Inventors: Rush D. Robinett, III, Tijeras, NM (US); David G. Wilson, Tijeras, NM (US); Steven Y. Goldsmith, Rochester, MN (US)

(73) Assignee: Sandia Corporation, Albuquerque, NM (US)

(*) Notice: Subject to any disclaimer, the term of this patent is extended or adjusted under 35 U.S.C. 154(b) by 671 days.

This patent is subject to a terminal disclaimer.

(21) Appl. No.: 13/481,418

(22) Filed: May 25, 2012

(65) Prior Publication Data

US 2012/0232709 A1 Sep. 13, 2012

Related U.S. Application Data

(63) Continuation-in-part of application No. 13/159,303, filed on Jun. 13, 2011, which is a continuation-in-part of application No. 12/633,045, filed on Dec. 8, 2009, now Pat. No. 8,527,247, which is a (Continued)

(51) Int. Cl.
| | |
|---|---|
| *H02J 3/38* | (2006.01) |
| *H02J 7/34* | (2006.01) |
| *H02J 3/00* | (2006.01) |

(52) U.S. Cl.
CPC .. *H02J 3/38* (2013.01); *H02J 3/382* (2013.01); *H02J 7/34* (2013.01); *H02J 2003/007* (2013.01); *Y02E 60/76* (2013.01); *Y04S 40/22* (2013.01)

(58) Field of Classification Search
USPC .......... 700/286, 295, 291, 297, 287, 97, 275, 700/276; 320/134, 137, 160; 307/31, 151; 360/20
See application file for complete search history.

(56) References Cited

U.S. PATENT DOCUMENTS

| | | | |
|---|---|---|---|
| 7,983,799 B2* | 7/2011 | Bose et al. | 700/297 |
| 8,164,217 B1 | 4/2012 | Miller | |
| 2002/0063430 A1* | 5/2002 | Amano | 292/201 |
| 2003/0011348 A1* | 1/2003 | Lof et al. | 322/37 |
| 2004/0124812 A1 | 7/2004 | Delmerico et al. | |
| 2007/0100506 A1* | 5/2007 | Teichmann | 700/297 |
| 2008/0212343 A1* | 9/2008 | Lasseter et al. | 363/39 |
| 2011/0082597 A1 | 4/2011 | Meagher | |

(Continued)

OTHER PUBLICATIONS

Paolo Piagi, Autonomous Control of Microgrids, Jun. 2006, IEEE, p. 1-8.*

Tuipule, et al., "Hybrid Large Scale System for a DC Microgrid", American Control Conference, San Francisco, CA, 2011. pp. 3890-3904.

(Continued)

*Primary Examiner* — Kidest Bahta
(74) *Attorney, Agent, or Firm* — Daniel J. Jenkins

(57) ABSTRACT

An electric power storage device is described herein, wherein the electric power storage device is included in a microgrid. The electric power storage device has at least one of a charge rate, a discharge rate, or a power retention capacity that has been customized for a collective microgrid. The collective microgrid includes at least two connected microgrids. The at least one of the charge rate, the discharge rate, or the power retention capacity of the electric power storage device is computed based at least in part upon specified power source parameters in the at least two connected microgrids and specified load parameters in the at least two connected microgrids.

17 Claims, 6 Drawing Sheets

Related U.S. Application Data continuation-in-part of application No. 12/474,349, filed on May 29, 2009, now abandoned, which is a continuation-in-part of application No. 12/052,180, filed on Mar. 20, 2008, now Pat. No. 8,121,708, application No. 13/481,418, which is a continuation-in-part of application No. 13/241,054, filed on Sep. 22, 2011.

(60) Provisional application No. 60/896,043, filed on Mar. 21, 2007.

(56) References Cited

U.S. PATENT DOCUMENTS

| | | |
|---|---|---|
| 2011/0106322 A1 | 5/2011 | Ou |
| 2011/0231028 A1 | 9/2011 | Ozog |
| 2012/0101639 A1 | 4/2012 | Carralero et al. |
| 2012/0119586 A1 | 5/2012 | Carralero et al. |

OTHER PUBLICATIONS

Guerrero, et al., "Hierarchical Control of Droop-Controlled DC and AC Microgrids—A General Approach Toward Standardization", IECON Proceedings, 2009, pp. 4341-4346.

Colson, et al., "Multi-agent Microgrid Power Management", 18th IFAC World Congress, Milano, Italy, Aug. 28-Sep. 2, 2011, pp. 3678-3683.

Xiao, et al., "Hierarchical MAS Based Control Strategy for Microgrid", Energies 2010, 2. Sep. 10, 2010. pp. 1622-1638.

Peng, et al., "Control and Protection of Power Electronics Interfaced Distributed Generation Systems in a Customer-Driven Microgrid", 2009 IEEE Power and Energy Society General Meeting, Jul. 26-30, 2009. pp. 1-8.

Robinett III, et al., "Enabling Secure, Scalable Microgrids with High Penetration Renewables: Grand Challenge Laboratory Directed Research and Development", Fact Sheet, Mar. 2011. pp. 1-2.

* cited by examiner

CUSTOMIZED ELECTRIC POWER STORAGE DEVICE FOR INCLUSION IN A COLLECTIVE MICROGRID

CROSS-REFERENCE TO RELATED APPLICATIONS

This application is a continuation-in-part of U.S. patent application Ser. No. 13/159,303, filed on Jun. 13, 2011, which is a continuation-in-part of U.S. patent application Ser. No. 12/633,045, filed on Dec. 8, 2009 now U.S. Pat. No. 8,527, 247, which is a continuation-in-part of U.S. patent application Ser. No. 12/474,349, filed on May 29, 2009 now abandoned, which is a continuation-in-part of U.S. patent application Ser. No. 12/052,180, filed on Mar. 20, 2008 now U.S. Pat. No. 8,121,708, which claims the benefit of U.S. Provisional Patent Application No. 60/896,043, filed on Mar. 21, 2007. This application is also a continuation-in-part of U.S. patent application Ser. No. 13/241,054, filed on Sep. 22, 2011. The entireties of each of these applications are incorporated herein by reference.

STATEMENT OF GOVERNMENTAL INTEREST

This invention was developed under Contract DE AC04-94AL85000 between Sandia Corporation and the U.S. Department of Energy. The U.S. Government has certain rights in this invention.

BACKGROUND

Relatively recently, there has been a push to rethink how electric power is provided to consumers. Conventionally, relatively large power plants burn fossil fuels to provide electric power to consumers. These power plants are typically controlled by private entities that bill consumers as a function of an amount of power utilized by the consumers over some time period. In the conventional grid, suppliers provide a seemingly infinite amount of energy to consumers, such that consumers can vary their demands for electric power, and the supplier meets the varying demands. Thus, consumers can simply request power (by turning on and off devices, by running air-conditioning units, etc.), and the supplier ensures that the requested power is available to the consumer. Of growing concern with respect to these types of power systems is the waste of non-renewable resources consumed by the power plants when producing electric power, as well as pollution generated by such power plants. For instance, generators utilized in conventional power plants are not configured to allow for scaled output—that is, such generators are configured to output a constant amount of electric power, regardless if such power is being utilized by consumers. Scaling operation of a generator downward based upon an amount of requested power will potentially result in damage to the generator.

In an attempt to reduce carbon emissions and other pollutants caused by these conventional power systems, distributed power systems that employ renewable energy to generate electric power have been manufactured and deployed. These types of power systems include, but are not limited to, wind turbine farms, hydro-turbines, solar panel fields, geothermal power systems, and the like. While these systems offer a promising alternative to the conventional power grid, there are various deficiencies associated therewith. First, such types of systems generally output variable amounts of power over time (depending upon sunlight, cloud cover, wind, and the like), rendering it difficult to meet changing demands of consumers. Additionally, these types of systems tend to be less efficient than the conventional power systems that burn fossil fuels, and the cost of building such systems on a wide scale tends to be relatively high. Further, such systems remain centralized in that if a natural disaster or other unexpected event causes one of such systems to be disabled, numerous consumers that are provided with power generated by such systems would be negatively impacted.

To overcome at least some of the deficiencies set forth above, microgrids have been theorized, wherein a microgrid comprises at least one independently owned electric power source that is configured to provide electric power to at least one consumer in an area that is local to the source of the electric power. Pursuant to an example, a homeowner can attach photovoltaic cells to the rooftop of her home. Additionally, the homeowner may have a storage device (a capacitor bank, a series of batteries, etc.) that is configured to capture electric power (generated by the photovoltaic cells) that is not consumed by the homeowner at the time that the electric power is generated, thereby allowing electric power retained in the storage device to be later retrieved when desired. Currently, designing a microgrid is an inexact science, often with a designer of the microgrid having to guess as to the equipment that will be needed to provide a suitable amount of power to a home, a building, a base, or other region served by the power source of the microgrid.

SUMMARY

The following is a brief summary of subject matter that is described in greater detail herein. This summary is not intended to be limiting as to the scope of the claims.

Described herein are various technologies pertaining to the design of a microgrid. With more particularity, an electric power storage device with parameters that are customized based upon parameters of sources and loads in a collective microgrid are described herein. Additionally, various technologies pertaining to computing data that is indicative of parameters of an electric power storage device to include in a collective microgrid are described herein, wherein the parameters of the electric power storage device ensure that specified performance constraints are met and that the collective microgrid remains stable.

A tool described herein includes functionality that allows a designer of a collective microgrid to specify parameters of power sources and loads of microgrids that are desirably combined to generate a collective microgrid. With more specificity, computer-implemented models of individual microgrids can be accessed by a designer, and the designer can indicate that two or more microgrids are desirably coupled for purposes of analysis. As will be understood by one skilled in the art, a microgrid can include an electric power source that outputs variable amounts of electric power over time, and a load in the microgrid can request variable amounts of power over time. For instance, the power source can be or include a wind turbine, a photovoltaic (PV) power system, a hydro-turbine, a geothermal power system, or some other suitable power system that employs renewable resources to generate varying amounts of power depending upon one or more environmental conditions. Using the tool, the designer of a collective microgrid can specify parameters of electric power sources in numerous microgrids that are desirably coupled to generate a collective microgrid. Additionally, the designer of the collective microgrid can specify parameters of loads of the numerous microgrids that are desirably coupled to generate the collective microgrid. In addition, the designer may optionally specify any cost constraints for one or more electric power storage devices that are to be included in the collective microgrid.

Responsive to the designer specifying that at least two computer implemented models of microgrids are desirably coupled to analyze the theoretical collective microgrid resulting from such coupling, data indicative of location of an electric power storage device in the collective microgrid and parameters of the electric power storage device are output, wherein such parameters meet specified performance constraints and ensure that the collective microgrid remains stable. In a non-limiting example, a particular homeowner may wish to create her own microgrid. As such, the homeowner may have photovoltaic cells attached to the roof of her home and may wish that the home be detached (or at least detachable) from the conventional grid. To ensure that the demands of the homeowner for power are consistently met (even at night), the homeowner may recognize that an electric power storage device may be necessary to capture excess electric power generated by the photovoltaic power system during the day, such that the electric power storage device can discharge at least some electric power at night to meet the demands of the homeowner. The homeowner, however, may be a member of a homeowners association that includes numerous houses, where other homeowners may also have at least some electric power-generating equipment, such as micro-turbines, hydro-turbines, etc. Therefore, it may be beneficial to a collection of homeowners in the neighborhood to share resources and generate a collective microgrid, such that resources of the homeowners are shared (including electric power storage).

The tool described herein provides the ability for a designer to specify at least two separate microgrids that may be desirably coupled by way of a transmission line, thereby creating a collective microgrid. The tool can then output data that is indicative of both location and physical parameters of an electric power storage device to ensure that the collective microgrid meets the electric power demands of members of the homeowners association, and to further ensure that the resultant collective microgrid remains stable.

In an exemplary embodiment, a computer-implemented model of a collective microgrid (networked microgrids) is described, wherein the model is based upon a plurality of DC bus microgrids coupled by a transmission line. Each DC bus microgrid has two boost converters fed by voltage sources that are connected to a DC bus to power an equivalent load. The model can include various possible locations of electric power storage therein, and the tool can output data that is indicative of parameters of the storage devices at the possible locations that substantially optimize performance of the collective microgrid while ensuring stability thereof. Potential electric power storage devices that may map to the parameters output by the tool include a collection of batteries, a capacitor bank, a flywheel, or the like. Additionally, the tool may output data that indicates that another power source (such as a fossil-fuel burning power source) is needed to meet the performance demands and to ensure stability of the collective microgrid.

Other aspects will be appreciated upon reading and understanding the attached figures and description.

DETAILED DESCRIPTION

Figure 1:
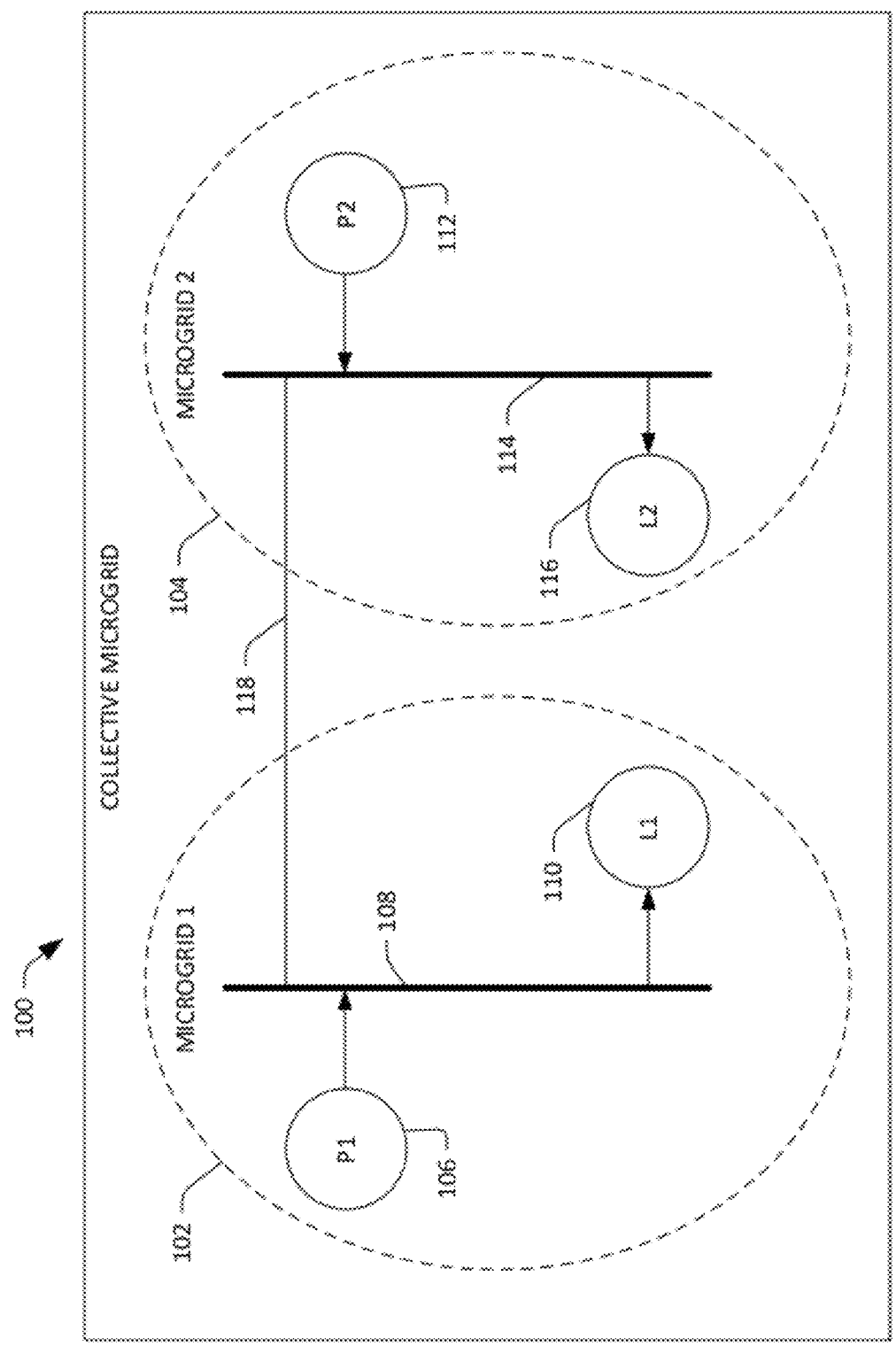
FIG. 1 is a diagram of a collective microgrid that comprises two desirably coupled microgrids.

Various technologies pertaining to designing a collective microgrid will now be described with reference to the drawings, where like reference numerals represent like elements throughout. In addition, a functional block diagram of an exemplary system is illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware-only configurations that perform certain functionality, including field programmable gate arrays (FPGAs) or other suitable hardware.

With reference now to FIG. 1, an exemplary collective microgrid 100 is illustrated. As used herein, the term "collective microgrid" is intended to encompass a microgrid that includes at least two microgrids coupled by a transmission line. The term "microgrid" is intended to encompass an electric power system that is detachable from, or permanently detached from, the conventional electric power grid. Accordingly, a microgrid, as the term is utilized herein, includes at least one electric power source that generates electric power and a load that consumes electric power. A microgrid also includes a power bus, wherein at least some power produced by the electric power source of the microgrid charges the power bus, and wherein the load retrieves electric power from the power bus. In an exemplary embodiment, the power bus can be a direct current (DC) power bus, although in other embodiments the power bus may be an alternating current (AC) power bus. In an exemplary embodiment, the power source of a microgrid may be a variable power source including, but not limited to, a wind turbine, a photovoltaic cell, a hydro-pump, a geothermal power system, a solar power tower, or other suitable variable power source. In another exemplary embodiment, the power source of a microgrid may be a fossil fuel burning power source that is configured to output a relative constant amount of power, such as a fossil fuel-powered generator.

The collective microgrid 100 is shown as including two microgrids: a first microgrid 102 and a second microgrid 104. It is to be understood, however, that the collective microgrid 100 may include more than two microgrids. The first microgrid 102 includes a first electric power source 106, wherein at least some of the electric power generated by the first electric power source 106 is employed in connection with providing power to a first power bus 108. The first microgrid 102 additionally includes a first load 110 that extracts electric power from the first power bus 108. The second microgrid 104 includes a second electric power source 112. The second microgrid 104 further comprises a second power bus 114, which is provided with at least some of the electric power generated by the second electric power source 112. The second microgrid 104 additionally includes a second load 116 that is configured to extract electric power from the second power bus 114

As will be readily recognized by one skilled in the art, the first microgrid 102 and/or the second microgrid 104 may operate sub-optimally, particularly if the first electric power source 106 and/or the second electric power source 112 are variable power sources. With more specificity, if the first electric power source 106, for example, is a variable power source, then there may be instances where electric power generated by the first electric power source 106 is unable to meet the demands for power set forth by the first load 110. With respect to the first microgrid 102, then, the designer of such first microgrid 102 may desirably include an electric power storage device at a particular location in the first microgrid 102 to ensure that the demands of the load 110 are consistently met (or at least a predefined specification is met), as well as to ensure that the microgrid 102 remains stable in view of changing demands of the first load 110 and varying amounts of power output by the first electric power source 106.

Therefore, the designer of the first microgrid 102 may wish to position an electric power storage device in the first microgrid 102 such that when the first electric power source 106 generates a surplus of electric power, the surplus is retained in the electric power storage device. Likewise, when there is a deficit of electric power produced by the first electric power source 106, the demands of the first load 110 can be met by discharging electric power stored in the electric power storage device. The same may be true for the second microgrid 104 (e.g. it may be necessary to include an electric power storage device in the second microgrid 104 to ensure that demands of the second load 116 are consistently met).

Oftentimes, however, scaling upwards increases economic benefit of owners/operators of respective microgrids. Accordingly, for instance, when designing a microgrid system, it may be beneficial to pool the resources of numerous individual microgrids to generate the collective microgrid 100. In other words, rather than separately considering the first microgrid 102 and the second microgrid 104 when determining electric power storage requirements respectively therefor, it may be economically beneficial to ascertain electric power storage device parameters for the collective microgrid 100. Thus, a designer of a microgrid can select computer-implemented models of the first microgrid 102 and the second microgrid 104, and can indicate that the first power bus 108 is desirably coupled to the second power bus 114 (and potentially other electric power buses of other microgrids) by a transmission line 118, thereby creating a collective power bus that is collectively charged by the first electric power source 106 and the second electric power source 112. In such an arrangement, both the first load 110 and the second load 116 can retrieve electric power from the collective power bus.

The two computer-implemented models of the microgrids 102 and 104 include specifications of parameters of the respective electric power sources 106 and 108 and specifications of parameters of the respective loads 110 and 116. In an exemplary embodiment, the parameters of the power sources can be selected such that the power sources and loads are represented as generating and consuming varying amounts of electric power over time. For instance, a pseudo-random function can be employed to represent at least one of the electric power sources 106 or 112 and/or at least one of the loads 110 or 116. In another exemplary embodiment, functions that represent the time-varying nature of electric power produced or consumed by electric power sources and loads, respectively, can be employed in connection with representing at least one of the electric power sources 106 or 112 and/or at least one of the loads 110 or 116. In still yet another exemplary embodiment, the parameters can be based upon observed data, such as a function that is fit to observed data to accurately represent performance of an electric power source or load.

A computer-implemented model of the collective microgrid 100, while not shown in FIG. 1, can also include numerous potential locations of electric storage devices in the collective microgrid 100, such as on the power buses 108 and 114, on the transmission line 118, or other suitable locations. Responsive to receiving an indication that at least two microgrids are desirably combined to create a collective microgrid (through selected microgrid models), the tool outputs data that is indicative of optimal parameters of electric power storage devices at the varying locations in the collective microgrid. This data allows for a designer of the collective microgrid 100 to customize the collective microgrid 100, potentially with at least one customized electric power storage device to allow for optimal performance and stability. In some instances, the designer of the collective microgrid 100 may already own or have access to certain electric power storage devices with particular parameters; such electric power storage devices and their physical parameters can be pre-specified in the design tool as being a portion of the collective microgrid 100. The output of the tool, then, is data that is indicative of parameters of other electric power storage devices that are to be included in the collective microgrid 100, thereby facilitating effective/stable microgrid design while utilizing available resources.

As will be ascertained in the description below, computations undertaken by the tool can linearly scale with a number of microgrids considered in a collective microgrid 100. This is because, in one exemplary embodiment, the models of the microgrids have been designed in a manner that allows for linearly scalable computation when determining parameters of electric power storage devices to include in a collective or individual microgrid.

Figure 2:
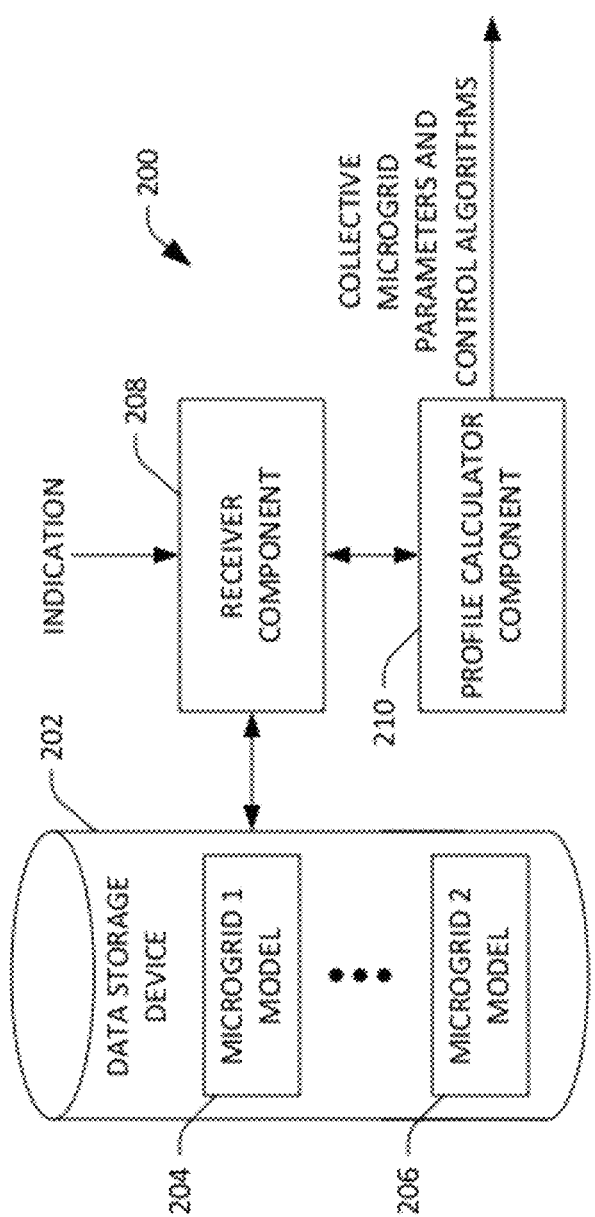
FIG. 2 is a functional block diagram of an exemplary system that facilitates outputting data that is indicative of at least one parameter of at least one electric power storage device that is to be included in a collective microgrid.

With reference now to FIG. 2, a functional block diagram of an exemplary system 200 that facilitates designing a collective microgrid is illustrated. The system 200 includes a data storage device 202, which may be memory, a hard drive, a flash drive, or other suitable data storage device. The data storage device 202 comprises a plurality of computer-implemented models of microgrids 204-206. Each model in the data storage device 202 includes computer-implemented representations of the following: an electric power source, a load, a power bus, and at least one potential electric power storage device, which can be represented as a variable. The power source and load in a respective model can be represented as a time-varying power source and/or load as described above.

The system 200 further comprises a receiver component 208 that receives an indication from a designer of a collective microgrid that at least two microgrids represented in the plurality of models 204-206 are desirably connected to create a collective microgrid. In an example, two potential microgrids can be represented in the data storage device 202 and can appear on a graphical user interface as selectable graphical icons. The designer of the collective microgrid can select the models from a library of models and indicate that at least two microgrids represented by selected models are desirably combined to generate a collective microgrid. This can be represented as a transmission line coupling respective power buses of the selected microgrids.

Figure 3:
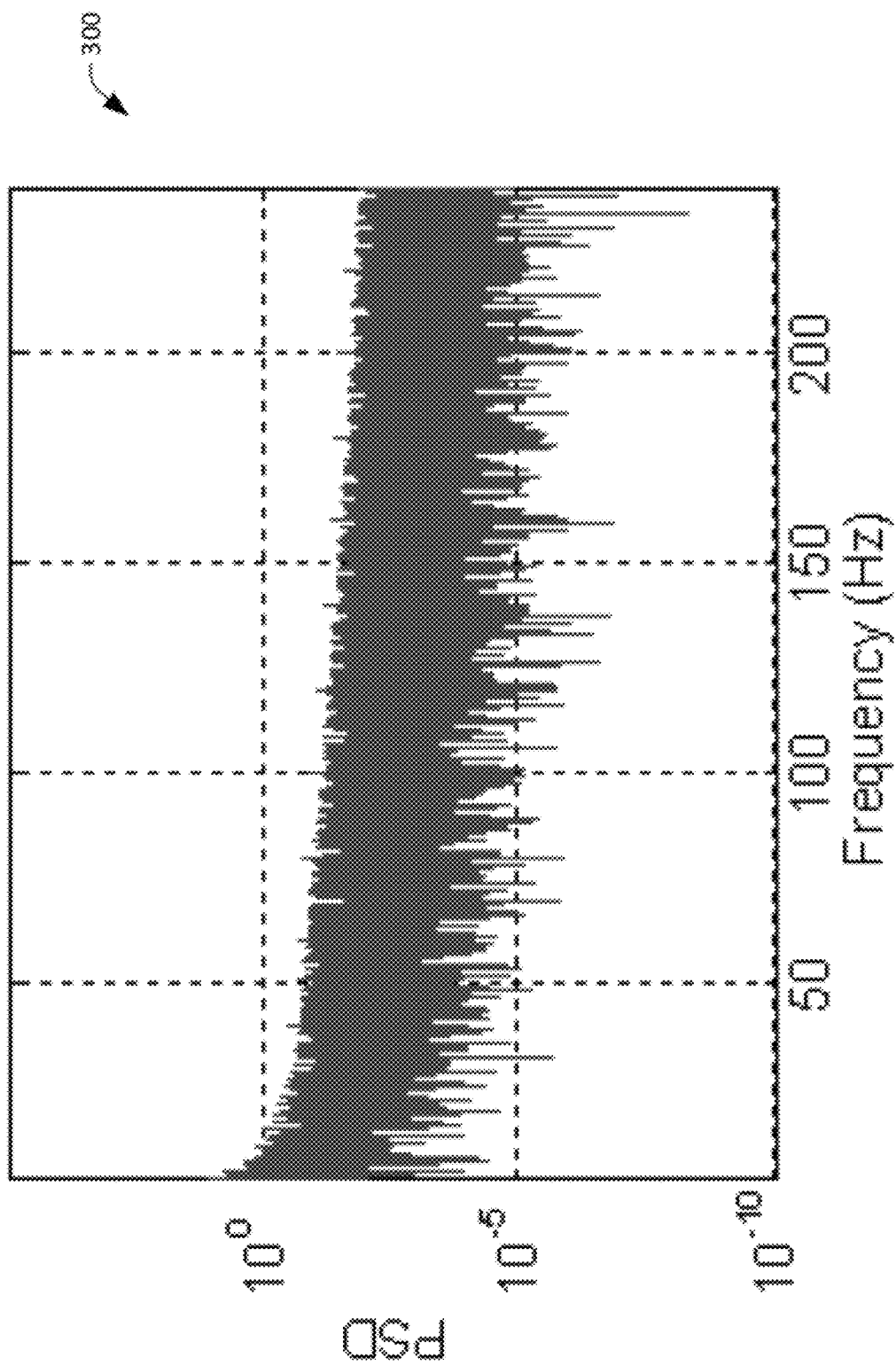
FIG. 3 is an exemplary graph illustrating frequency response parameters of an electric power storage device that is to be included in a collective microgrid.

The system 200 further comprises a profile calculator component 210 that, responsive to the receiver component 208 receiving the indication that the plurality of models are desirably combined to create a collective microgrid, generates a customized power profile for an electric power storage device for inclusion in the collective microgrid at a particular location. The profile calculator component 210 generates the customized power profile for the electric power storage device based at least in part upon the plurality of computer-readable models of microgrids that are desirably combined to create the collective microgrid. Therefore, the designer of the collective microgrid is provided with at least one customized power profile for an electric power storage device that is to be included in the collective microgrid, and the designer can then have designed (custom-made) or otherwise locate an electric power storage device that corresponds to such profile. Turning briefly to FIG. 3, an exemplary graph 300 illustrating frequency response parameters of an electric power storage device is shown, wherein such frequency response parameters can be output by the profile calculator component 204.

As will be described in detail below, the customized power profile for the electric power storage device can conform to at least one stability constraint for the collective microgrid. In other words, the designer can specify performance requirements for the collective microgrid. For instance, the designer may wish to allow the loads to demand electric power at historically observed levels. The customized profile for the electric power storage device ensures that the performance constraints are met while additionally ensuring that collective microgrid remains stable. In an example, the designer of the collective microgrid can review the custom power profile for the electric power storage device and ascertain that such profile conforms to a battery or collection of batteries. In another example, the designer of the collective microgrid may analyze the custom power profile for the electric power storage device and determined that such profile corresponds to a capacitor bank. In still yet another example, the designer of the collective microgrid can review the custom profile for the electric power storage device generated by the profile calculator component 210 and determine that such profile corresponds to a flywheel. In still yet another example, the custom profile generated by the profile calculator component 210 may conform to some other suitable source of electric power such as a generator. Accordingly, in this instance, a generator can be considered an electric power storage device.

Still further, the profile calculator component 210 can output control algorithms that are to be implemented in electric power devices to ensure that the collective microgrid remains stable. Such control algorithms can be proportional-integral (PI) control algorithms. Parameters of an electric power storage device that can be ascertained based upon the custom profile can be or include electric power storage capacity, charge rate, and/or discharge rate. The designer of the collective microgrid may also take into consideration cost when designing the collective microgrid. For instance, relatively high capacity electric power storage devices may be somewhat expensive; accordingly, the designer of the electric power microgrid can set an upper bound on capacity. This can cause the profile calculator component 210 to ensure that the capacity of any one electric power storage device that is to be included in the collective microgrid does not go above the upper bound of capacity. The designer may specify other thresholds for other parameters as well.

An exemplary utilization of the system 200 will now be described. It is to be understood that such exemplary utilization is not intended to limit the scope of the hereto-appended claims. The collective microgrid designer may be provided with computer-implemented models of microgrids pertaining to a particular neighborhood, wherein several individual homes in the neighborhood have power generation systems corresponding thereto, such as geothermal power systems, wind turbines, photovoltaic cells, hydro-turbines, generators, etc. The models of the respective microgrids can include representations of the power sources on the homes in the neighborhood as well as representations of historic loads of such homes. The collective microgrid designer may then selectively choose certain microgrids or collections of microgrids to ascertain whether it makes economic sense to combine several microgrids into a collective microgrid or series of collective microgrids. The designer can utilize the system 200 to obtain custom profiles for electric power storage devices to include in the collective microgrid to ensure stability of the proposed collective microgrid. The collective microgrid designer may then obtain or design a customized electric power storage device for inclusion in the collective microgrid.

Figure 4:
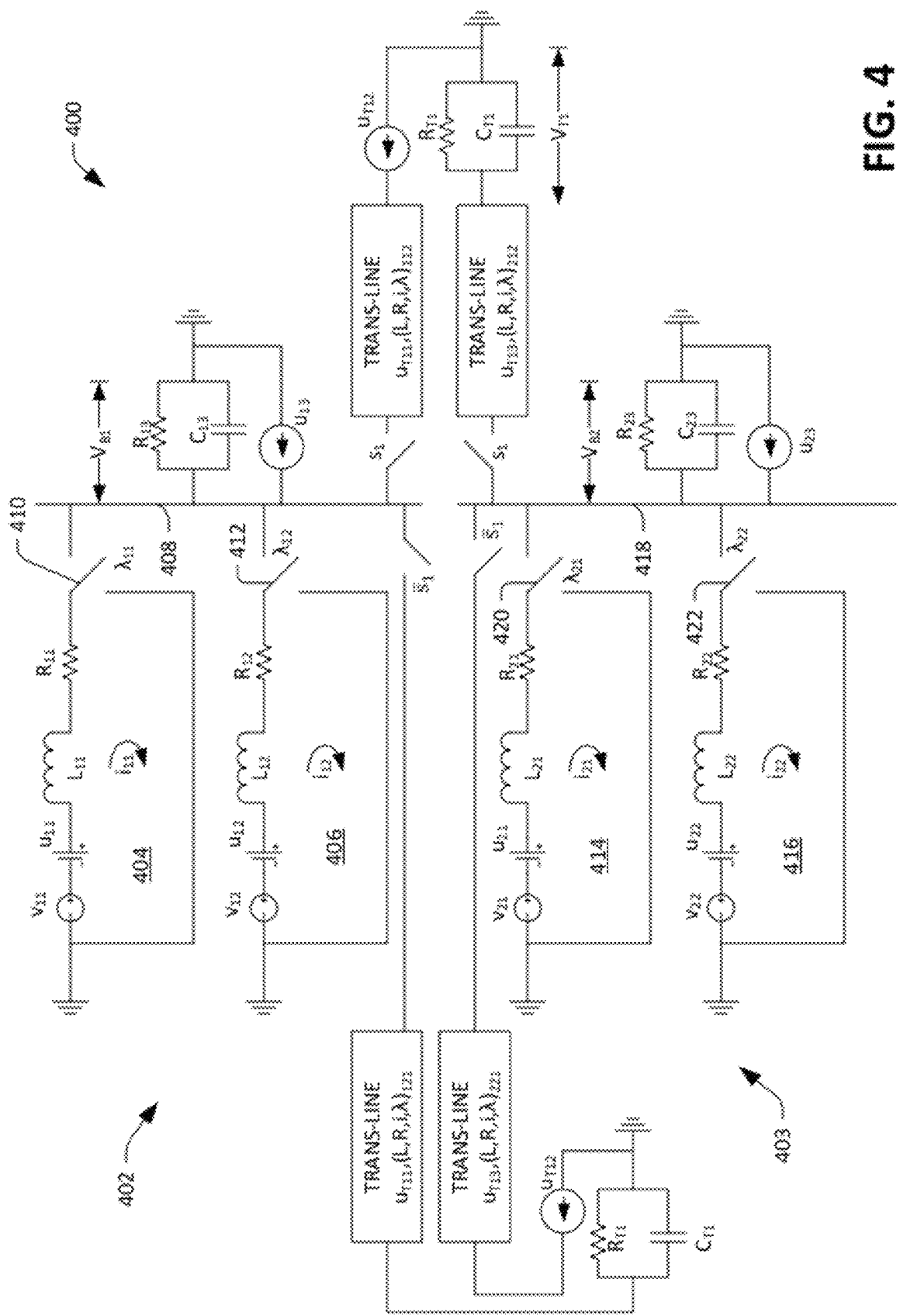
FIG. 4 is an exemplary model of a collective microgrid.

Now referring to FIG. 4, an exemplary model 400 of a collective microgrid is illustrated. The model 400 includes representations of two DC bus microgrids connected by a transmission line. It is to be understood, however, that another model may include more than two microgrids and that such microgrids may be AC bus microgrids. The model 400 includes a first model 402 of a first microgrid and a second model 403 of a second microgrid. The first model 402 includes a first boost converter 404 and a second boost converter 406 that are coupled to a first DC bus 408 by way of respective switches 410 and 412. The second model 403 of the second microgrid includes a third boost converter 414 and a fourth boost converter 416 that are coupled to a second DC bus 418 by way of respective switches 420 and 422. The two boost converters in a microgrid are connected to a respective DC bus to power an equivalent load. The circuit equations for the first DC bus microgrid 402 with two boost converters, energy storage systems, and bidirectional transmission line are as follows:

$$L_{11}\dot{x}_{11} = -R_{11}x_{11} - \lambda_{11}x_{13} + v_{11} + u_{11}$$

$$L_{12}\dot{x}_{12} = -R_{12}x_{12} - \lambda_{12}x_{13} + v_{12} + u_{12}$$

$$C_{13}\dot{x}_{13} = \lambda_{11}x_{11} + \lambda_{12} + \bar{s}_1\lambda_{121}x_{121} - g_{13}x_{13} - s_1x_{112} + u_{13} \quad (1)$$

where
$(x_{11}, x_{12}) = (i_{11}, i_{12})$; boost converter currents;
$\lambda_{11}, \lambda_{12} =$ boost converter duty cycles;
$R_{11}, R_{12} =$ boost converter resistances;
$L_{11}, L_{12} =$ boost converter inductances
$v_{11}, v_{12} =$ source voltages (renewable or fossil);
$x_{13} = v_{18}$; voltage of DC bus 418;
$g_{13} =$ DC bus 418 equivalent conductance;
$C_{13} =$ DC bus 418 equivalent capacitance;
$u_{11}, u_{12} =$ energy storage voltage sources (electric power storage devices);
$u_{13} =$ energy storage current source (electric power storage device);
$\bar{s}_1, s_1 =$ transmission line currents;
$(x_{112}, x_{121}) = (i_{112}, i_{121})$; transmission line currents;
$\lambda_{121} =$ transmission line duty cycle.

Circuit equations for the second DC bus microgrid 403 are similar, and are omitted here for sake of brevity.

A transmission line 424 is connected to the two DC bus microgrids 402 and 403 with bidirectional boost converters and with appropriate switching logic. The circuit equations for the transmission line are shown in FIG. 4, with $\bar{s}_1=1$ and $s_1=0$:

$$L_{121}\dot{x}_{121} = R_{121}x_{121} - \lambda_{121}x_{13} + v_{T1} + u_{T11}$$

$$C_{T1}\dot{v}_{T1} = \lambda_{221}x_{221} - g_{T1}v_{T1} - x_{121} + u_{T12}$$

$$L_{221}\dot{x}_{221} = -R_{221}x_{221}\lambda_{221}v_{T1} + x_{23} + u_{T13} \quad (2)$$

and with $\bar{s}_1=0$ and $s_1=1$:

$$L_{112}\dot{x}_{112} = -R_{112}x_{112} - \lambda_{112}v_{T1} + x_{13} + u_{T11}$$

$$C_{T1}\dot{v}_{T1} = -\lambda_{112}x_{112} - g_{T1}v_{T1} - x_{212} + u_{T12}$$

$$L_{212}\dot{x}_{212} = -R_{212}x_{212} - \lambda_{212}x_{23} + v_{T1} + u_{T13}. \quad (3)$$

With $\bar{s}_1=s_1=0$, the buses are disconnected.

The overall circuit model for the network microgrids with $\bar{s}_1=1$ and $s_1=0$ is given as follows:

$$L_{11}\dot{x}_{11} = -R_{11}x_{11} - \lambda_1 x_{13} + v_{11} + u_{11}$$

$$L_{12}\dot{x}_{12} = -R_{12}x_{12} - \lambda_{12}x_{13} + v_{12} + u_{12}$$

$$C_{13}\dot{x}_{13} = \lambda_{11}x_{11} + \lambda_{12}x_{12} + \lambda_{121}x_{121} - g_{13}x_{13} + u_{13}$$

$$L_{121}\dot{x}_{121} = -R_{121}x_{121}\lambda_{121}x_{13} + v_{T1} + u_{T11}$$

$$C_{T1}\dot{v}_{T1} = \lambda_{221}x_{221} - \lambda_{T1}v_{T1} - x_{121} + u_{T12}$$

$$L_{221}\dot{x}_{221} = -R_{221}x_{221} - \lambda_{221}v_{T1} + x_{23} + u_{T13}$$

$$L_{21}\dot{x}_{21} = -R_{21}x_{21} - \lambda_{21}x_{23} + v_{21} + u_{21}$$

$$L_{22}\dot{x}_{22} = -R_{22}x_{22} - \lambda_{22}x_{23} + v_{22} + u_{22}$$

$$C_{23}\dot{x}_{23} = \lambda_{21}x_{21} + \lambda_{21}x_{21} + \lambda_{22}x_{22} - g_{23}x_{23} - x_{221} + u_{23} \quad (4)$$

The state space model is given as follows:

$$\dot{M}x = Rx + v + u = [\bar{R} + \tilde{R}]x + v + u \quad (5)$$

$$x = [x_{11}\ x_{12}\ x_{13}\ x_{121}\ v_{T1}\ x_{221}\ x_{21}\ x_{22}\ x_{23}]^T$$

$$v = [v_{11}\ v_{12}\ 0\ 0\ 0\ 0\ v_{21}\ v_{22}\ 0]^T$$

$$u = [u_{11}\ u_{12}\ u_{13}\ u_{T11}\ u_{T12}\ u_{T13}\ u_{21}\ u_{22}\ u_{23}]^T$$

with $$M = \begin{bmatrix} L_{11} & & & & & & & & \\ & L_{12} & & & & & & & \\ & & C_{13} & & & & & & 0 \\ & & & L_{121} & & & & & \\ & & & & C_{T1} & & & & \\ & & & & & L_{221} & & & \\ & & & & & & L_{21} & & \\ 0 & & & & & & & L_{22} & \\ & & & & & & & & C_{23} \end{bmatrix}$$

and $$R = \begin{bmatrix} R_{S1} & & 0 \\ 0\ 0\ 0\ -1\ -g_{T1}\ -\lambda_{221} & 0\ 0\ 0 \\ 0\ 0\ 0\ 0\ -\lambda_{221}\ -R_{221} & \\ 0 & & R_{S2} \end{bmatrix}$$

where $$R_{S1} = \begin{bmatrix} -R_{11} & 0 & -\lambda_{11} & 0 & 0 \\ 0 & -R_{12} & -\lambda_{12} & 0 & 0 \\ \lambda_{11} & \lambda_{12} & -g_{13} & \lambda_{121} & 0 \\ 0 & 0 & -\lambda_{121} & -R_{121} & 1 \end{bmatrix}$$

and $$R_{S2} = \begin{bmatrix} -R_{12} & 0 & -\lambda_{21} \\ 0 & -R_{22} & -\lambda_{21} \\ \lambda_{21} & \lambda_{22} & -g_{23} \end{bmatrix}$$

It can be noted that the R matrix in Eq. (5) is written as a diagonal matrix, $\bar{R}$, and a skew symmetric matrix $\tilde{R}$. Additionally, it can be noted that this model is self-similar with respect to a single DC bus microgrid design, thereby allowing for scalability.

The duty cycle commands can be obtained from the steady-state solution of Eq. (5) with u=0 as:

$$Rx+v = [\bar{R}+\tilde{R}]x+v=0,$$

which leads to the following:

$$\bar{R}x+\tilde{R}x=-v \quad (6).$$

In order to solve for the duty cycle vector:

$$\Lambda = [\lambda_{11}\lambda_{12}\lambda_{121}\lambda_{221}\lambda_{21}\lambda_{22}]^T,$$

a general solution methodology can be realized with constrained optimization techniques.

The solution to Eq. (6) is used to update the nominal duty cycles for all of the boost converters to meet the desired DC bus voltages in both microgrids $x_{13}$ and $x_{23}$, as the renewable energy voltage supplies, v, vary over time. It can be noted that the duty cycle commands are fully coupled across the entire network microgrids in order to balance the generation or power supplies with the required requested loads.

With respect to boost converter servo loop control, typically the guidance control duty cycle commands, or $\lambda$'s, would provide to a servo loop control system the reference command and the feedback would correct for disturbances and parameter mismatches. For the purposes of this specific derivation, the servo loop control is considered ideal and the control vector will compensate for disturbances and uncertainties in the system.

To design for Hamiltonian Surface Shaping and Power Flow Control (HSSPFC), an error state for Eq. (5) can be defined as follows:

$$\tilde{x}=x_{ref}-x, \quad (7)$$

where the reference data is defined as follows:

$$M\dot{x}_{ref} = [\bar{R}+\tilde{R}]x_{ref}+v+u_{ref} \quad (8)$$

For this example, the reference vector is a constant, and the reference control is given by the following:

$$u_{ref}=-[\bar{R}+\tilde{R}]x_{ref}+v \quad (9)$$

The second step is to define the Hamiltonian as follows:

$$H = \tfrac{1}{2}\tilde{x}^T M \tilde{x}, \quad (10)$$

which is positive definite about $\tilde{x}=0$ and is the static stability condition. The time derivative or power flow is determined in the following manner:

$$\begin{aligned}\dot{H} &= \tilde{x}^T M \dot{\tilde{x}} \\ &= \tilde{x}^T [M\dot{x}_{ref} - M\dot{x}] \\ &= \tilde{x}^T \left[(\overline{R}+\tilde{R})x_{ref} + v + u_{ref} - (\overline{R}+\tilde{R})x - v - u\right] \\ &= \tilde{x}^T(\overline{R}+\tilde{R})\tilde{x} + \tilde{x}^T(u_{ref}-u) \\ &= \tilde{x}^T \overline{R}\tilde{x} + \tilde{x}^T \Delta u\end{aligned}$$

since $$\tilde{x}^T \tilde{R}\tilde{x} = 0.$$

Now, a PI controller can be selected for the following:

$$\Delta u = -K_P \tilde{x} - K_I \int_0^t \tilde{x} d\tau, \quad (11)$$

which leads to $$u = u_{ref} - \Delta u \quad (12)$$

and $$\dot{H} = \tilde{x}^T(\overline{R}-K_P)\tilde{x} - \tilde{x}^T K_I \int_0^t \tilde{x} d\tau < 0$$

so that $$\tilde{x}^T(K_P - \overline{R})\tilde{x} > -\tilde{x}^T K_I \int_0^T \tilde{x} d\tau, \quad (13)$$

or also known as the dynamic stability condition.

It may be useful to discuss or point out several observations about Eqs. (9) and (12). First, Eq. (9) is an equivalent guidance command for the energy storage systems. It is fully coupled in the states of both microgrids and dependent on the duty cycle commands Λ. The duty cycle commands will be determined from an optimization routine (SQP, DP, etc.) when desired cost functions and constraints are included.

For renewable energy sources, v will be time varying and possibly stochastic, which leads to an under-actuated system for 0% energy storage, u=0. Networked microgrids have the potential to overcome part of this problem with spatial distribution, which can help minimize effects of clouds or lack of local wind. For fossil energy sources, v will be dispatchable with excess capacity, which can lead to an over-actuated system with 100% energy storage, even with u=0.

For u≠0, the networked microgrids with 100% transient renewable energy sources (photovoltaic cells, wind, etc.) can lead to the requirement for energy storage systems. The energy storage systems are shown in FIG. 4 as being modeled as voltage sources and current sources. Networked microgrids have the potential to optimize the overall energy storage system.

The control, u, is decoupled, which simplifies the design process, and the controller, u, acts as both an energy source and a load depending upon the requirements of the networked microgrid topology and the stability and performance of the networked microgrids. The controller can buffer the transient behavior of the renewable energy supplies, as well as provide main power at night for a 100% photovoltaic microgrid. It can therefore be ascertained that the above discussion pertains to the design of feedback controllers for the integration of renewable energy into a network collective of DC bus microgrid systems. Such feedback controllers include both the feedback guidance command that implements boost converter duty cycle and an energy storage control system based on HSSPFC. A theoretical example that includes two boost converters and equivalent variable loads for each microgrid along with bidirectional transmission circuits have been described above to demonstrate both static and dynamic stability conditions, as well as transient performance. Other exemplary models will be contemplated by one skilled in the art, and the claims are not intended to be limited by the exemplary networked microgrids described above.

Figure 5:
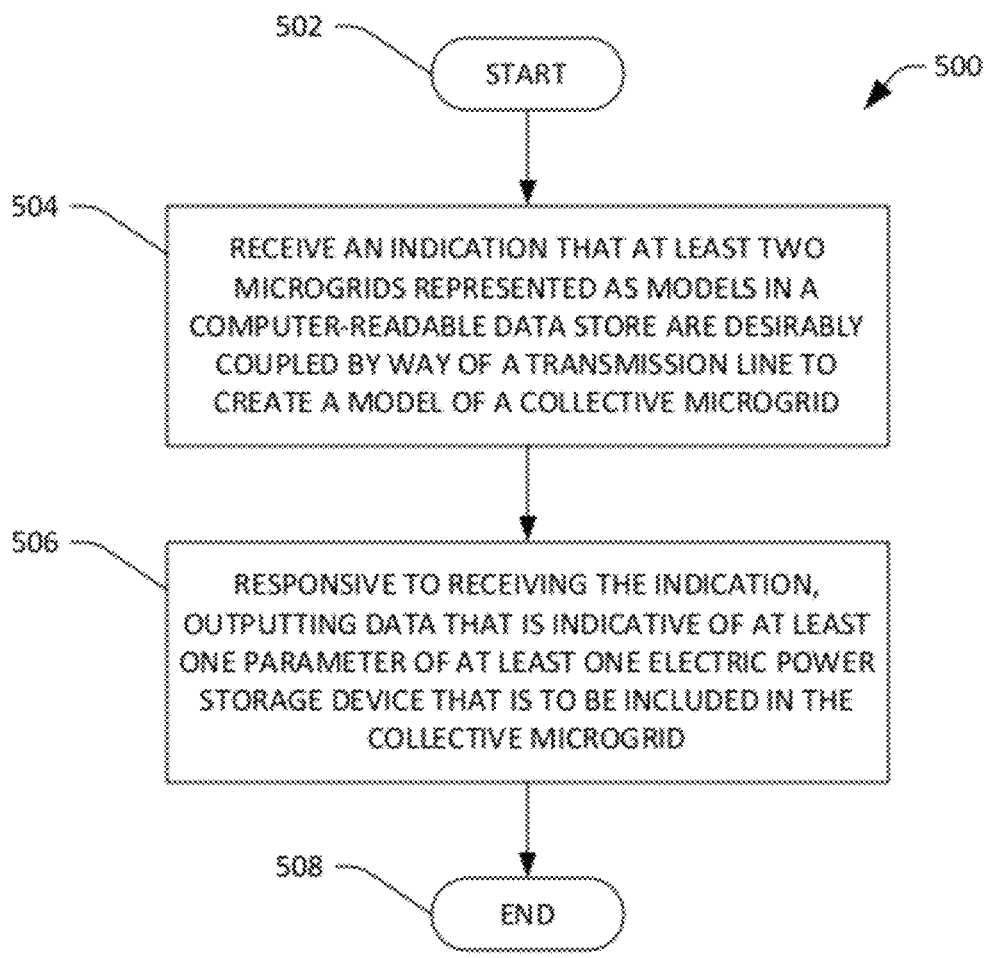
FIG. 5 is a flow diagram that illustrates an exemplary methodology for outputting data that is indicative of at least one parameter of at least one electric power storage device that is to be included in a collective microgrid.

With reference now to FIG. 5, an exemplary methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

FIG. 5 is illustrative of an exemplary methodology 500 that facilitates outputting data that is indicative of at least one parameter of at least one electric power storage device that is to be included in a collective microgrid. The methodology 500 starts at 502, and at 504 an indication is received that at least two microgrids represented as computer-implemented models are desirably coupled by way of an electric transmission line to create a collective microgrid. It is to be understood that the electric transmission line is operative to couple respective power buses of the at least two microgrids, wherein such power buses, for instance, can be DC power buses. Each computer-implemented model of a microgrid includes a representation of a source of electric power, which may be variable in nature; a representation of a variable load that consumes electric power; and a representation of a power bus that electrically couples the source of electric power and the variable load. The source of electric power is configured to charge the power bus, while the variable load consumes power from the power bus.

At 506, responsive to receiving the indication, data is output that is indicative of at least one parameter of at least one electric power storage device that is to be placed in the collective microgrid. The at least one parameter is customized for collective microgrid, wherein the at least one parameter conforms to a stability constraint defined for the collective microgrid. This can result in the design of an electric power storage device that is to be included a collective microgrid, wherein the electric power storage device has at least one of a charge rate, a discharge rate, or a power retention capacity that has been customized for the collective microgrid. The charge rate, the discharge rate, or the power retention capacity of the electric power storage device can be computed based at least in part upon specified power source parameters in the at least two connected microgrids, as well as specified load parameters in the at least two connected microgrids. In an example, such an electric power storage device may be or include at least one of rechargeable battery, a capacitor bank, a flywheel, or the like.

Figure 6:
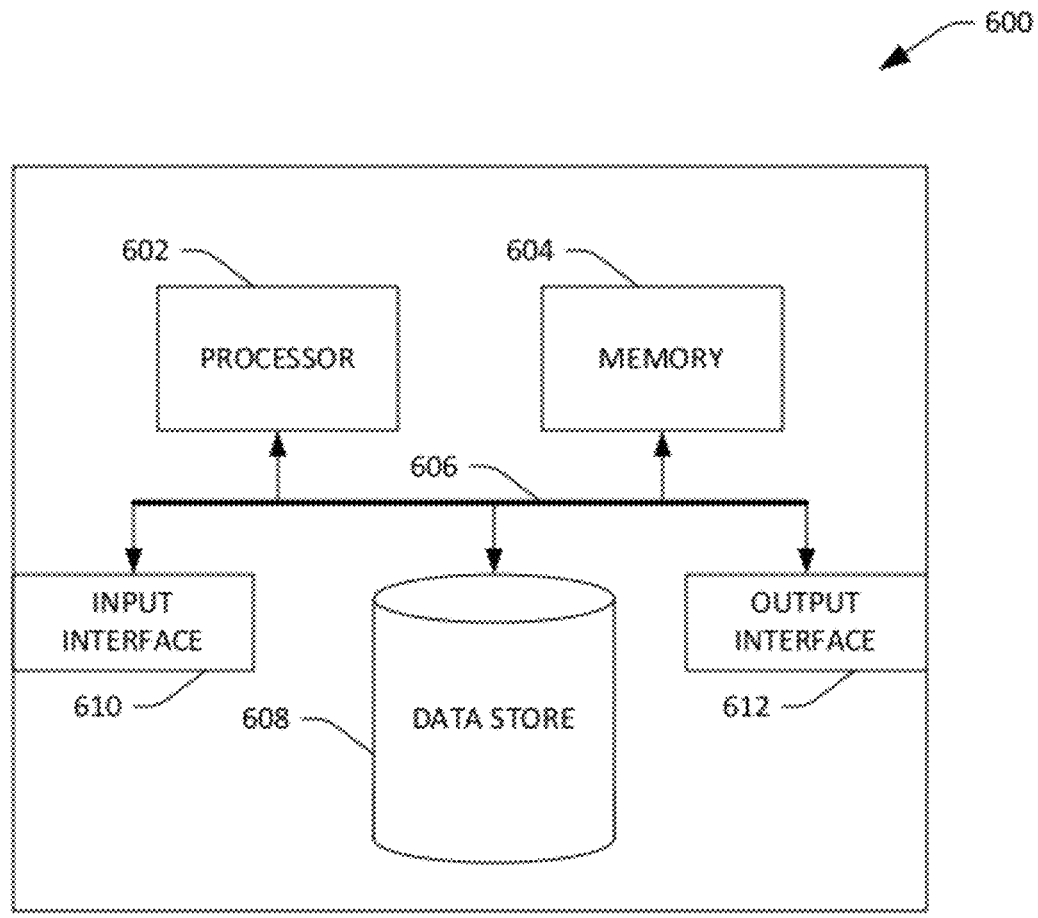
FIG. 6 is an exemplary computing device.

Now referring to FIG. 6, a high-level illustration of an exemplary computing device 600 that can be used in accordance with the system and methodology disclosed herein is illustrated. For instance, the computing device 600 may be used in a system that supports computing at least on parameter of an electric power storage device that is to be included in a collective microgrid. In another example, at least a portion of the computing device 600 may be included in power electronics with customized parameters. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing the method described above. The processor 602 may access the memory 604 by way of a system bus 606. In addition to storing executable instructions, the memory 604 may also store models of microgrids, parameters of modules of microgrids, etc.

The computing device 600 additionally includes a data store 608 that is accessible by the processor 602 by way of the system bus 606. The data store may be or include any suitable computer-readable storage, including a hard disk, memory, etc. The data store 608 may include executable instructions, models of microgrids, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a portion of a distributed system. Thus, for instance, several devices may be in communication by way of a network connection and may collectively perform tasks described as being performed by the computing device 600.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
    receiving an indication that at least two microgrids represented as computer-implemented models are coupled by way of an electric transmission line to create a collective microgrid model, the electric transmission line operative to couple respective buses of the at least two microgrids, wherein each computer-implemented model of a microgrid comprises representations of the following:
        a source of electric power;
        a variable load that consumes electric power; and
        a power bus that electrically couples the source of electric power and the variable load, wherein the source of electric power is configured to charge the power bus, and wherein the variable load consumes power from the power bus; and
    responsive to receiving the indication, outputting a control algorithm that comprises at least one parameter of at least one electric power storage device that is to be placed in the collective microgrid, the at least one parameter customized for the collective microgrid, and wherein the at least one parameter conforms to a stability constraint defined for the collective microgrid;
    wherein the at least one parameter of the at least one storage device is one of electric power storage capacity, charge rate, or discharge rate; and
    implementing the control algorithm in an electric power storage device in a collective microgrid represented by the collective microgrid model.

2. The method of claim 1, wherein the source of electric power in at least one of the two microgrids is a variable source of electric power.

3. The method of claim 2, wherein the variable source of electric power comprises at least one of a photovoltaic power system, a wind turbine, a geothermal power system, a solar power tower, or a hydro pump.

4. The method of claim 1, wherein the data is indicative of values of at least one parameter for multiple storage devices distributed at different locations in the collective microgrid.

5. The method of claim 1, wherein the power buses in the at least two microgrids are direct current power buses.

6. The method of claim 1, wherein the computer-implemented models comprise representations of respective variable loads that are indicative of time-varying requirements of the variable loads.

7. The method of claim 1, wherein each microgrid in the plurality of microgrids is respectively modeled as comprising a plurality of boost converters.

8. The method of claim 1, wherein the data comprises a profile of the at least one parameter of the at least one electric power storage device, wherein the profile is indicative of the at least one parameter of the electric power storage device that is to be included in the collective microgrid that satisfies the stability constraint.

9. A system, comprising:
    a receiver component that receives an indication that a plurality of computer-readable models of microgrids are desirably combined to create a computer-readable model of a collective microgrid, wherein each computer-readable model of a microgrid comprises a respective computer-readable representation of a power source and a respective computer-readable representation of a load; and
    a profile calculator component that, responsive to the receiver component receiving the indication, generates a control algorithm comprising a customized profile for at least one parameter of an electric power storage device for inclusion in the collective microgrid,
    wherein the profile generator component generates the customized profile based at least in part upon the plurality of computer-readable models of microgrids that are desirably combined to create the computer-readable model of the collective microgrid having a predetermined stability constraint; and
    wherein the control algorithm is implemented in at least one electric power storage device in a collective microgrid represented by the collective microgrid model.

10. The system of claim 9, wherein the customized profile conforms to at least one stability constraint for the collective microgrid.

11. The system of claim 9, wherein the computer-readable representation of the power source represents the power source as a variable power source.

12. The system of claim 11, wherein the computer-readable representation of the power source represents the power source as one of a photovoltaic power system, a wind turbine, a geothermal power system, a solar power tower, or a hydro pump.

13. The system of claim 9, wherein the computer-readable representation of the loads represents the load as a time-varying load.

14. The system of claim 9, wherein each computer-readable model of a microgrid comprises a representation of a respective direct current bus, and wherein the computer-readable model of the collective microgrid comprises a computer-readable representation of a transmission line between respective direct current buses represented in the computer-readable models of the microgrids.

15. The system of claim 9, wherein the customized profile for the storage device conforms to a collection of batteries.

16. The system of claim 9, wherein the customized profile for the storage device conforms to a flywheel.

17. The system of claim 9, wherein the customized profile for the storage device conforms to a capacitor bank.

* * * * *